(12) United States Patent
Vetter

(10) Patent No.: US 8,714,005 B2
(45) Date of Patent: May 6, 2014

(54) PIEZOELECTRIC ACTUATOR FOR DOWNHOLE APPLICATIONS

(75) Inventor: Thomas Vetter, Niedersachen (DE)

(73) Assignee: Baker Hughes Incorporated, Houston, TX (US)

( * ) Notice: Subject to any disclaimer, the term of this patent is extended or adjusted under 35 U.S.C. 154(b) by 463 days.

(21) Appl. No.: 13/016,820

(22) Filed: Jan. 28, 2011

(65) Prior Publication Data

US 2011/0192222 A1    Aug. 11, 2011

Related U.S. Application Data

(60) Provisional application No. 61/302,751, filed on Feb. 9, 2010.

(51) Int. Cl.
*G01V 1/40* (2006.01)

(52) U.S. Cl.
USPC ........................................ 73/152.58

(58) Field of Classification Search
USPC ........... 73/632, 642, 649, 662, 668, 663, 73/152.57, 152.58, 152.47, 152.16; 367/166, 157, 25, 155
See application file for complete search history.

(56) References Cited

U.S. PATENT DOCUMENTS

| | | | |
|---|---|---|---|
| 4,570,096 A | 2/1986 | Hara et al. | 310/328 |
| 4,703,215 A | 10/1987 | Asano | 310/328 |
| 4,706,230 A | 11/1987 | Inoue et al. | 367/174 |
| 5,063,542 A | 11/1991 | Petermann et al. | 367/166 |
| 5,099,460 A * | 3/1992 | Poturnicki et al. | 367/157 |
| 5,115,880 A | 5/1992 | Sallas et al. | 181/106 |
| 6,025,671 A * | 2/2000 | Boecking | 310/369 |

FOREIGN PATENT DOCUMENTS

| | | |
|---|---|---|
| EP | 0494480 | 7/1992 |
| WO | 9104585 | 4/1991 |

OTHER PUBLICATIONS

International Search Report and Written Opinion for PCT/US 2011/024182, dated Jul. 26, 2011, 8 pages.
PCT Notification Concerning Transmittal of International Preliminary Report on Patentability, Dated Aug. 23, 2012, International Application No. PCT/US2011/024182.

* cited by examiner

*Primary Examiner* — Peter Macchiarolo
*Assistant Examiner* — Tamiko Bellamy
(74) *Attorney, Agent, or Firm* — Bracewell & Giuliani LLP

(57) ABSTRACT

A transducer for use with a downhole tool, where the transducer includes concentric piezoelectric elements coupled with a member that extends from the top surface of one element to the bottom surface of another element. The elements expand and contract to vibrate by applying electrical potential to the elements. The element having the member on its bottom surface expands and contracts with applied electrical potential and also is urged upward, by the coupling member, an amount equal to the vertical displacement of the element having the member on its top surface. Thus the element having the member on its bottom surface is vertically displaced by an amount substantially equal to the expansion of the elements.

5 Claims, 3 Drawing Sheets

PIEZOELECTRIC ACTUATOR FOR DOWNHOLE APPLICATIONS

CROSS REFERENCE TO RELATED APPLICATIONS

This application claims priority to and the benefit of U.S. Provisional Application Ser. No. 61/302,751, filed Feb. 9, 2010, the full disclosure of which is hereby incorporated by reference herein.

BACKGROUND

1. Field of Invention

The invention relates generally to the field of non-destructive testing. More specifically, the present invention relates to a piezoelectric device that vibrates at an increased displacement amplitude.

2. Description of Prior Art

Wave motion through a medium can yield useful information about the medium without being invasive or damaging the medium; and may be remotely deployed to areas inaccessible by first hand observation. Examples of mediums through which wave motion is studied include liquids (subsea or downhole), sensors, load bearing structures, subterranean strata, and tubulars. Bonding between two or more members can also be evaluated by evaluating wave motion through a bond or interface of the two members. Devices used for generating waves include piezoelectric transducers, electromagnetic acoustic transducers, wedge transducers, and the like.

Illustrated in FIG. 1 is an example of inducing and studying wave propagation within a hydrocarbon producing wellbore. Hydrocarbon producing wellbores 2 are drilled from the surface 16 into a subterranean formation 17 having entrained hydrocarbons. Typically set within the wellbore 2 is casing 4 bonded to the inner surface of the wellbore 2. The casing 4 is bonded within the wellbore 2 by cement 6 within an annulus between the casing 4 and wellbore 2. The resulting cement bond not only adheres the casing 4 within the wellbore 2, but also serves to isolate adjacent zones (Z1 and Z2) within the formation 17 from one another. Isolating adjacent zones can be important when one of the zones Z1, Z2 contains oil or gas and the other zone includes a non-hydrocarbon fluid such as water. Should the cement 6 surrounding the casing 4 be defective and fail to provide isolation of the adjacent zones, water or other undesirable fluid can migrate into the hydrocarbon producing zone thus diluting or contaminating the hydrocarbons within the producing zone.

To detect possible defective cement bonds, downhole tools 8 have been developed for acoustic interrogation within a wellbore 2. These downhole tools 8 are generally deployed on a wireline 10 into the wellbore 2. Typically, the wireline 10 inserts into the wellbore 2 through a wellhead assembly 11 via a pulley system 12. Wireline 10 is spooled on a surface truck 14 that can provide communication with the tool 8 through the wireline 10. Typically, transducers 18 are provided on the tool 8 capable for generating acoustic waves into the casing 4, and for recording the attenuation of acoustic waves as they travel, or propagate, across the surface of the casing 4. Each transducer 18 may only transmit an acoustic signal, may only receive an acoustic signal, or may both transmit an acoustic signal and receive a corresponding acoustic signal; where the corresponding acoustic signal propagates along and/or through the casing 4. Analyzing the propagation velocity and attenuation of the received acoustic wave yields information concerning the casing 4 or formation adjacent the wellbore 2. As is known, pads 19 can be attached to the outer surface of the downhole tool 8 that provide a pedestal on which the transducers 18 can be mounted.

SUMMARY OF INVENTION

Disclosed herein is a transducer, in an example embodiment the transducer is an acoustic transducer made up of a first electrically responsive member with an upper end and a lower end. A second electrically responsive member is included that also has an upper end and a lower end. A mechanical coupling couples the first and second electrically responsive members by having a portion in contact with the upper end of the first electrically responsive member connected to another portion in contact with the lower end of the second electrically responsive member. In this configuration, by energizing the first electrically responsive member and second electrically responsive member, the upper end of the second electrically responsive member is displaced by an amount at least as great as the elongation of the first electrically responsive member in addition to the second electrically responsive member. A cap can be included with the transducer that is in contact with the upper end of the second electrically responsive member. Optionally, a preloaded spring member can be set between the cap and housing. In one example, the electrically responsive members can include a piezoelectric material, an electroactive polymer, or a liquid that responds to electrical potential. In an example, the first electrically responsive member is a cylindrically element. In one example, the second electrically responsive member is an annular member that coaxially circumscribes the first electrically responsive member. In one example embodiment, the mechanical coupling has a mid section with a generally hollow cylindrical space with an opening in which the upper end of the first electrically responsive member is inserted, and a flange around the opening on which the second electrically responsive member is disposed. In an example embodiment, the first and second electrically responsive members are in electrical communication with a power source for energizing the first and second electrically responsive members. In an example embodiment, the transducer includes a cap, a plurality of additional electrically responsive members and mechanical couplings, so that when the electrically responsive members are energized the electrically responsive members are elongated and the cap is displaced an amount at least as great as the sum of the elongation of the electrically responsive members. Alternatively, the combination of the first and second electrically responsive members has more than one resonant vibrating frequency.

Also disclosed herein is a method of acoustically investigating a borehole. In an example embodiment the method includes providing a transducer that is made up of a first electrically responsive member having an upper end and a lower end, a second electrically responsive member having an upper end and a lower end, and a mechanical coupling in contact with the upper end of the first electrically responsive member and the lower end of the second electrically responsive member. The method of this embodiment includes disposing the transducer within a wellbore and producing an acoustic signal in the wellbore by energizing both the first and second electrically responsive members. Energizing the members displaces the upper end of the second electrically responsive member by an amount at least as great as the elongation of the first electrically responsive member and the second electrically responsive member. Optionally, the signal is directed into a medium in the wellbore and the propagated signal can be recorded with the transducer. In an alternate embodiment the transducer is tuned to have more than one resonant frequency, where the tuning can be based on the characteristics of the first and second electrically responsive members. Alternatively, the electrically responsive members include a material such as a piezoelectric material, an electroactive polymer, a electrically responsive liquid, as well as combinations thereof. In an example embodiment, the first electrically responsive member is a cylindrically element. In an example embodiment, the second electrically responsive member is an annular member that coaxially circumscribes the first electrically responsive member. In an example embodiment, the mechanical coupling has a mid section with a generally hollow cylindrical space with an opening in which the upper end of the first electrically responsive member is inserted, and a flange around the opening on which the second electrically responsive member is disposed.

Yet further disclosed herein is a downhole tool. In an example embodiment the downhole tool includes a tool housing and an acoustic transducer on the tool housing. In this embodiment, the transducer includes an annular housing, a cap set over an end of the annular housing, a piezoelectric member disposed within the annular housing and having an upper end facing the cap and a lower end, a coupling having an upper end supported on an end of the piezoelectric member proximate the cap and a pedestal coupled with the upper end that is disposed between the upper and lower ends of the piezoelectric member, and an annular piezoelectric tube circumscribing the coupling and having an end on the pedestal. In this configuration, when the piezoelectric member and piezoelectric tube are energized, the piezoelectric member and piezoelectric tube expand and contract and the piezoelectric tube is displaced an amount substantially equal to expansion of the piezoelectric member and piezoelectric tube. In an alternative embodiment, the transducer includes a pre-loaded spring in the housing that applies a compressive force against the piezoelectric tube. Optionally, the piezoelectric member and piezoelectric tube are in electrical communication with a power source for energizing the first and second electrically responsive members. The downhole tool may further include a plurality of electrically responsive members and mechanical couplings, so that when the electrically responsive members are energized the electrically responsive members are elongated and the cap is displaced an amount at least as great as the sum of the elongation of the electrically responsive members. Alternatively, the combination of the piezoelectric member and piezoelectric tube has more than one resonant vibrating frequency.

BRIEF DESCRIPTION OF DRAWINGS

Some of the features and benefits of the present invention having been stated, others will become apparent as the description proceeds when taken in conjunction with the accompanying drawings, in which.

Figure 1:
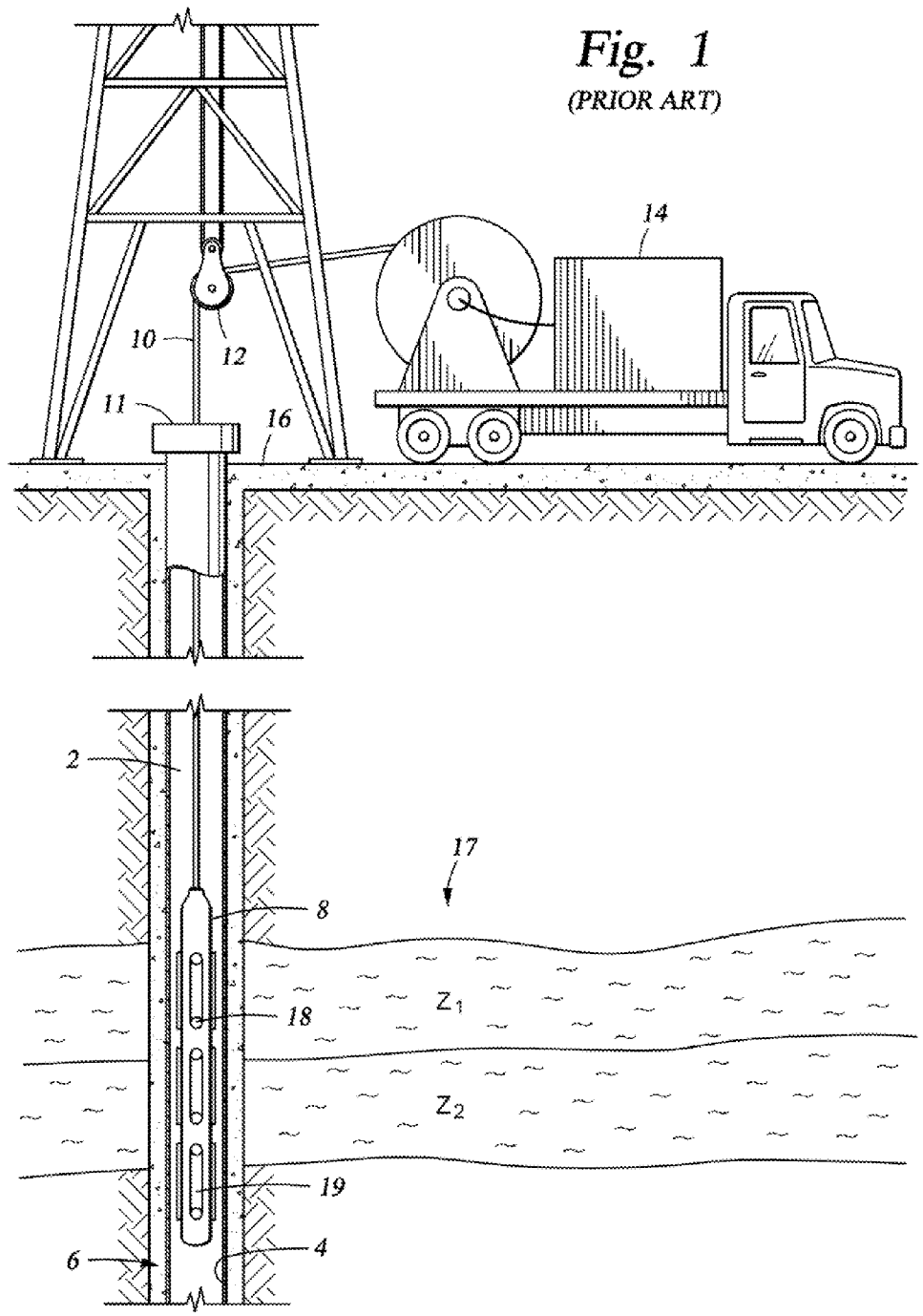
FIG. 1 is a partial side sectional view of a prior art downhole system.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be through and complete, and will fully convey the scope of the invention to those skilled in the art. Like numbers refer to like elements throughout.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

Figure 2:
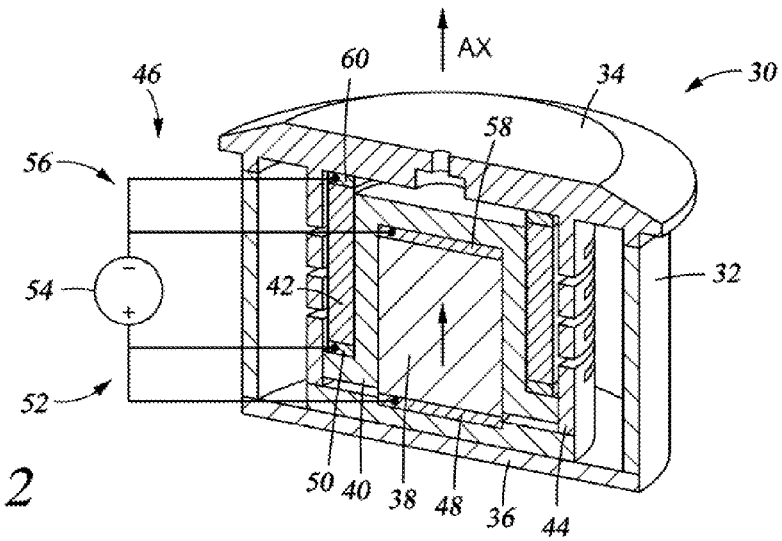
FIG. 2 is a perspective sectional view of an example of a transducer for use with a downhole tool.

Referring now to FIG. 2, shown in a perspective sectional view is an example of a transducer 30 that can be used for generating an acoustic signal, receiving an acoustic signal, or both generating and receiving an acoustic signal. The transducer 30 of FIG. 2 is shown having a generally cylindrical housing 32 and with a disk-like cap 34 provided on the upper end of the housing 32. The cap 34 extends radially past the walls of the housing 32 and in the embodiment of FIG. 2, has a top surface beveled along an outer circumference. The housing 32 and cap 34 can be formed from metal as well as an elastomeric material. A disk-like planar base 36 is shown set in the lower portion of the housing 32 and normal to an axis $A_x$ of the transducer 30.

The transducer 30 includes electrically responsive elements that respond when subjected to electrical potential. In this example, a piezoelectric cylinder 38 is set on the base 36 and positioned so its elongate side is substantially parallel with the axis $A_x$. A mechanical coupling 40 is shown set over the piezoelectric cylinder 38. The mechanical coupling 40 has a substantially cylindrically shaped mid portion. The mid portion of the coupling 40 is generally hollow to define an cylindrically shaped space therein. An opening on a lower side of the coupling 40 faces the bottom of the housing 32, is proximate the base 36, and provides access to the space. The opening receives an upper end of the piezoelectric cylinder 38 allowing insertion of the piezoelectric cylinder 38 into the space. The mechanical coupling 40 includes a flange portion that extends radially outward from the open end and runs substantially parallel with the base 36. The surface of the flange portion opposite the base 36 is also shown to be substantially planar and defines a surface generally parallel to the base 36. An annular piezoelectric tube 42 is shown disposed around the mechanical coupling 40 and having a lower radial surface that sets on the flange portion of the mechanical coupling 40.

An electrical circuit 46 is schematically depicted and shown in electrical communication with the piezoelectric cylinder 38 and piezoelectric tube 42. A lower contact 48 is set between the piezoelectric cylinder 38 and the base 36 and another lower contact 50 is between the lower radial surface of the piezoelectric tube 42 and flange portion of the mechanical coupling 40. Electrical leads 52 connect the contacts 48, 50 to an electrical power device 54. Examples of an electrical power device 54 include a battery, generator, and the like. The circuit 46 is completed by leads 56 shown depending from the electrical power supply 54 and to upper connectors 58, 60 shown provided on the respective upper surfaces of the piezoelectric cylinder 38 and piezoelectric tube 42.

In one example of operation, activating the power supply 54 produces current in the leads 52 that forms an electrical field across the contacts 48, 50. The electrical fields induce an electrical potential difference across the piezoelectric cylinder 38 and piezoelectric tube 42 to cause them to expand and/or contract. As illustrated by the arrows, the piezoelectric cylinder 38 and piezoelectric tube 42 expand in the direction of the arrows forcing the piezoelectric tube 42 against the cap 34. Repeated expansion and contraction of the piezoelectric cylinder 38 and piezoelectric tube 42 produces vibration that may be applied to a medium. In an example, the vibration travels through the medium as a wave, which may be referred to as a signal. In embodiments that including the cap 34, vibration may be induced in the medium by the cap 34 contacting the medium during each stroke of vibration. The vertical displacement of the piezoelectric tube 42 shown in the embodiment of FIG. 2 exceeds the vertical expansion of the piezoelectric tube 42 because the piezoelectric tube 42 is being lifted by the mechanical coupling 40 from vertical expansion of the piezoelectric cylinder 38. One of the advantages of the embodiment shown, is the ability to provide an additive displacement, such as realized by components placed in series, of different piezoelectric elements, while minimizing space usage by arranging the elements in a parallel-like configuration.

When a voltage is applied to the piezoelectric material, the material will experience a strain that causes it to expand. When the voltage is removed, the strain is removed and the material contracts. A non-limiting list of potential piezoelectric materials for use with embodiments of the present invention includes ceramics, quartz, poly-crystalline piezoelectric ceramics, and quartz analogue crystals like berlinite (AlPO4) and gallium orthophosphate (GaPO4), ceramics with perovskite or tungsten-bronze structures (BaTiO3, KNbO3, LiNbO3, LiTaO3, BiFeO3, NaxWO3, Ba2NaNb5O5, Pb2KNb5O15).

Optionally, the electrically responsive material may be an electroactive polymer. Suitable electroactive polymer materials include any substantially insulating polymer or rubber (or combination thereof) that deforms in response to an electrostatic force or whose deformation results in a change in electric field. More specifically, exemplary materials include silicone elastomers, acrylic elastomers such as VHB 4910 acrylic elastomer, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

An optional resilient element 44 is illustrated circumscribing the piezoelectric tube 42 and having a lower radial side set on the base 36. The upper radial side of the resilient element 44 terminates at the lower surface of the upper end 34. The resilient element 44 as shown is made up of a series of U-shaped members connected in series at their opposing ends. In the example embodiment of FIG. 2, when the resilient element 44 is deformed, potential energy is stored within the U-shaped members. In one example of use, the resilient element 44 may be pre-stressed when installed within the transducer 30.

Figure 3:
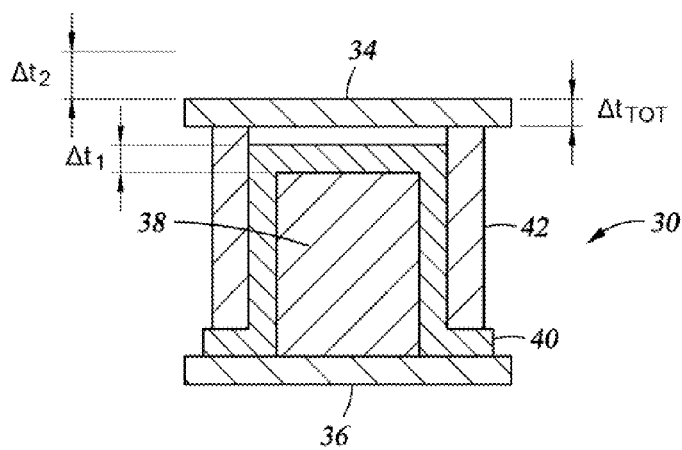
FIG. 3 is a side sectional view of an embodiment of a portion of the transducer of FIG. 2.

Referring now to FIG. 3, an example of the transducer 30 of FIG. 2 is shown in a side sectional view. In this example, the base 36 is shown as having a rectangular cross-section with the piezoelectric cylinder 38 perched on its mid-portion. The mechanical coupling 40 is illustrated having its radial flange portion extending outward from its hollow cylindrically-shaped mid-portion. The flange portion of the mechanical coupling 40 may be in contact with the base 36 or set slightly above the base 36. Circumscribing the mid-portion of the mechanical coupling 40 is the piezoelectric tube 42 having its lower radial surface resting on the upper surface of the flange of the coupling 40. The cap 34 is shown at the upper terminal end of the piezoelectric tube 42. Distance $\Delta t_1$ schematically represents vertical displacement of the piezoelectric cylinder 38 when energized and distance $\Delta t_2$ schematically represents vertical displacement of the piezoelectric tube 42 when energized. The additive effect realized by coaxially stacking the piezoelectric tube 42 and piezoelectric cylinder 38 with the mechanical coupling 40 produces a total displacement $\Delta t_{TOT}$ of the cap 34 to be $\Delta t_1 + \Delta t_2$, rather than only $\Delta t_1$ or $\Delta t_2$.

Accordingly, one of the advantages of the present disclosure is the ability to impart displacements from the top of one expandable element to the lower portion of another expandable element, thereby obtaining a total displacement of an acoustic transducer that is at least as great as the sum of the elongation of each expanding element in the transducer. Optionally, the electrically responsive elements may include liquids that respond to electrical potential.

Figure 4:
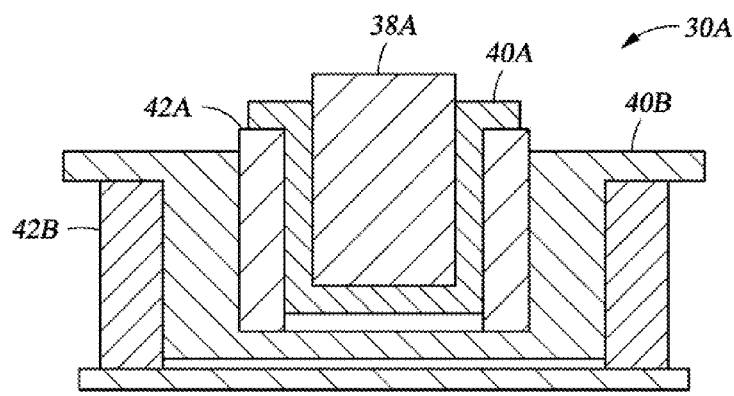
FIG. 4 is side sectional view of an alternative embodiment of the portion of FIG. 3.

Referring now to FIG. 4, an alternative embodiment of a transducer 30A is partially illustrated in a side sectional view. In this embodiment, a piezoelectric cylinder 38A is circumscribed by an inner piezoelectric tube 42A that is in turn circumscribed by an outer piezoelectric tube 42B. The piezoelectric cylinder 38A rests on a mechanical coupling 40A that has a cylindrical and hollow mid-portion with an open end. The open end of the mechanical coupling 40A is adapted to receive therein the piezoelectric cylinder 38A. A flange extends radially outward from the open end of the mechanical coupling 40A; the radial flange is supported by the upper surface of the inner piezoelectric tube 42A. An outer mechanical coupling 40B is shown having a hollow cylindrical mid-portion with an open end in which the inner piezoelectric tube 42A is inserted. An outwardly extending radial flange from the mid-portion of the outer mechanical coupling 40B rests on an upper surface of the outer piezoelectric tube 42B. The piezoelectric tube 42B is supported on a base 36A disposed within a housing (not shown) for the transducer. Accordingly, in this embodiment, a cap (not shown) of a transducer 30 (FIG. 2) may be contacted by the upper surface of the piezoelectric cylinder 38A with an amplitude of displacement equal to expansion of the piezoelectric cylinder 38A, the inner piezoelectric tube 42A and the outer piezoelectric tube 42B. Additional permutations are available having yet more piezoelectric tubes circumscribing concentric piezoelectric tubes and coupled by mechanical couplings as described herein.

Optionally, the inclusion of multiple electroacoustic elements in a single transducer provide for acoustic tuning whereby acoustic signals can be produced at more than one significant resonant frequency. Tuning a transducer in this fashion allows for tailored interrogation of materials where flexibility of acoustic signal frequency is desired or required.

Figure 5:
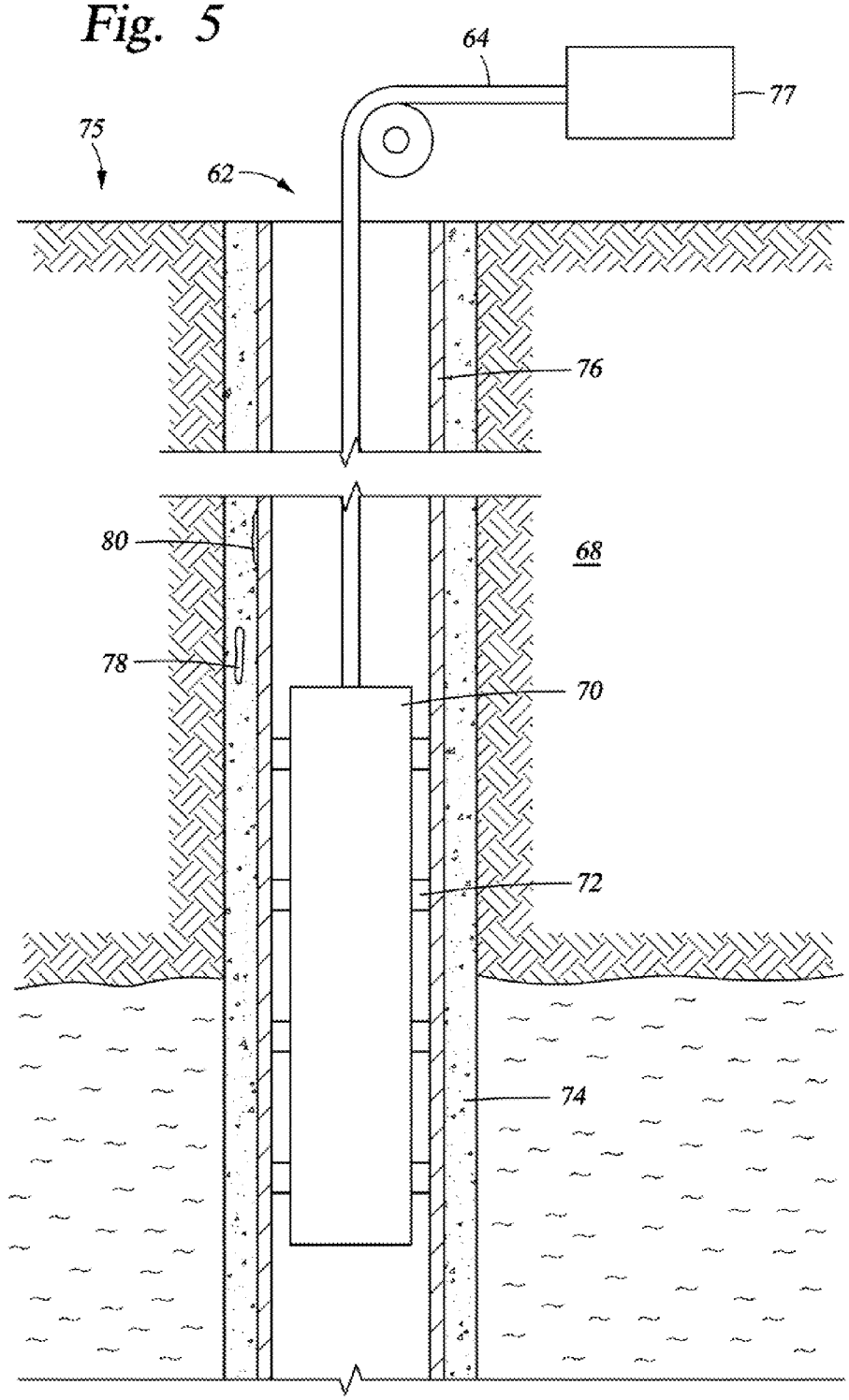
FIG. 5 is a side partial sectional view of a downhole tool having a piezoelectric transducer as described herein.

FIG. 5 illustrates a side partial sectional view of a downhole tool 70 disposed within a wellbore 62 formed into a subterranean formation 68. The downhole tool 70 includes transducers 72 that can comprise a mix of transmitters, receivers, or one or more of the transducers may provide both transmitting and receiving functions. The transducers 72 may include the piezoelectric actuators of FIGS. 2-4. By virtue of the included transducers 72, the downhole tool 70 is equipped to transmit a signal, such as an acoustic wave, into the casing 76 as well as the formation 68 and thereby induce an acoustic signal therein. Acoustic coupling between the tool 70 and casing 76 can occur by the cap 34 (FIG. 2) of the transducer 72 producing a signal in a fluid (not shown), such as water, mud, connate fluid, or a gas surrounding the tool 70, or by the cap 34 directly striking the casing 76. Optionally, a coupling medium, such as a highly viscous fluid, can be disposed between the transducer 72 and the casing 76 for carrying the signal from the transducer 72 to the casing 76. The included receivers enable the tool 70 to record the resulting induced signal propagating along the casing 76 and formation 68. Moreover, the transmitters may be tuned to emit a signal designed to induce a resonant frequency response in the casing 76 that may be detected by a receiver. As such, the downhole tool 70 may measure an induced frequency response of the casing 76.

In one embodiment of operation, the downhole tool 70 travels through the casing 76 (upwardly or downwardly) while inducing an acoustic signal into the casing 76 with its transmitters and recording the induced frequency response(s) with the receivers. The recorded response(s) can be analyzed in accordance with the method of signal analysis as described above, i.e. compared to the resonance of a reference tubular to evaluate a bond between the casing 76 and cement 74 disposed in the annulus around the casing 76. For example, the signal analysis may be used to detect microannuli 78 in the cement 74 as well as delaminations 80 where the cement 74 has debonded from the casing 76.

The recorded signal(s) may be stored within the downhole tool 70 for subsequent analysis or can be transmitted to the surface, such as via wireline 64, for realtime analysis. The analysis considered includes the steps and methods described above, including the steps and methods that comprise receiving the measured frequency response, compared the measured frequency response to that of a reference tubular, and evaluating a bond based on the comparison. An analyzer may be employed that is specifically configured to perform these analysis steps used in conjunction with the recorded acoustic signals and responses. The analyzer may be disposed with the downhole tool 70 or otherwise disposable within a wellbore. Optionally, the analyzer may be located at the surface, either a part of or the entire analyzing system, with the remaining portion downhole or at a remote location.

Still referring to FIG. 5, an information handling system (IHS) 77 may be coupled to the downhole tool 70 via the wire line 64. The IHS 77 may be employed for controlling the generation of the acoustic signal herein described and/or receiving the subsequent recording of the signal(s). Moreover, the IHS 77 may also be used to store recorded data as well as processing the data into a readable format. The IHS 77 may be disposed at the surface 75, in the wellbore 62, or partially above and below the surface 75. The IHS 77 may include a processor, memory accessible by the processor, nonvolatile storage area accessible by the processor, and logic algorithms for performing each of the steps above described.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the transducers 72 described herein can have multiple cross sectional configurations, including cylindrical, annular, rectangular, irregular shapes, asymmetric, and combinations thereof. The signals produced by the transducers 72 can be low frequency waves for traveling long distances (i.e. greater than 10 feet to 100's of feet) through a medium, medium frequency, and high frequency, such as 10 Hz and greater. Moreover, the transducers 72 can be used in any application. These and other similar modifications will readily suggest themselves to those skilled in the art, and are intended to be encompassed within the spirit of the present invention disclosed herein and the scope of the appended claims.

What is claimed is:

1. A downhole tool comprising:
    a tool housing; and
    an acoustic transducer on the tool housing comprising:
        an annular housing;
        a cap set over an end of the annular housing;
        a piezoelectric member disposed within the annular housing and having an upper end facing the cap and a lower end;
        a coupling having an upper end supported on an end of the piezoelectric member proximate the cap and a flange portion coupled with the upper end that is disposed between the upper and lower ends of the piezoelectric member; and
        an annular piezoelectric tube circumscribing the coupling and having an end on the flange portion, so that when an electrical potential is provided to the piezoelectric member and piezoelectric tube, the piezoelectric member and piezoelectric tube expand and contract and the piezoelectric tube is displaced an amount substantially equal to expansion of the piezoelectric member and piezoelectric tube.

2. The downhole tool of claim 1, wherein the transducer further comprises a pre-loaded spring in the annular housing that applies a compressive force against the piezoelectric tube.

3. The downhole tool of claim 1, wherein the piezoelectric member and piezoelectric tube are in electrical communication with a power source for energizing the piezoelectric member and piezoelectric tube.

4. The downhole tool of claim 1, further comprising a plurality of piezoelectric tubes and mechanical couplings, so that when the piezoelectric tubes are energized and become elongated, the cap is displaced an amount at least as great as the sum of the elongation of the piezoelectric tubes.

5. The downhole tool of claim 1, wherein the combination of the piezoelectric member and piezoelectric tube have more than one resonant vibrating frequency.

* * * * *